Patented Apr. 8, 1930

1,754,173

UNITED STATES PATENT OFFICE

ARTHUR R. MAAS, OF LOS ANGELES, CALIFORNIA

PROCESS OF REMOVING LEAD ARSENATE FROM FRUIT

No Drawing. Application filed December 21, 1926. Serial No. 156,265.

This invention relates to removing from fruit such as apples, pears, etc., a coating of lead arsenate which has been formed or left thereon as a result of spraying the fruit with lead arsenate solution for the purpose of killing the coddling moth. It is customary in some localities to spray apples and pears with lead arsenate for the purpose of killing the coddling moth. It has been found that the amount of arsenic left on fruit sprayed in this manner is considerably greater than is regarded as safe for human consumption and it has been found necessary or desirable to remove such lead arsenate or at least the major portion thereof from the fruit before the same is placed on the market. For the purpose of such a removal several methods have been suggested, for example wiping the fruit, washing the fruit in a weak solution of hydrochloric acid and washing in a weak solution of caustic soda. The first method is impractical due to the fact that it is extremely difficult to remove the arsenic in the calyx by wiping and due to carelessness on the part of some of the help, there is no assurance that all of the arsenic will be wiped from the balance of the fruit. This means that wiped fruit contains above the tolerance of arsenic permitted by the United States Department of Health.

The other two methods suggested are impractical due to the danger of burning the fruit.

I have found that the lead arsenate can be removed from the fruit effectively or to a degree which is sufficient for all practical purposes by use of a non-acid solution of sodium-thiosulphate at suitable concentration. For this purpose it is desirable to use an aqueous solution of sodium thiosulphate in the proportion in excess of one pound to a gallon of water and preferably containing three to five pounds of thiosulphate to a gallon of water.

To lessen the surface tension of the solution and to assist in wetting the fruit as well as to penetrate any oil that may be present, I have found that the addition of soap or alkali will facilitate the action of the thiosulphate.

After the fruit is washed in this solution for the proper length of time, usually from one to ten minutes, it is well washed with fresh water and allowed to dry.

It will be understood that in place of sodium thiosulphate any other thiosulphate may be used which is capable of dissolving lead arsenate for example other alkali metal thiosulphates, for example, potassium thiosulphate, ammonium thiosulphate, or an alkaline earth thiosulphate, for example calcium thiosulphate, it being understood that in case a thiosulphate other than sodium thiosulphate is used it may be necessary to use a different proportion of the same with water in solution according to the molecular weight of the compound used as compared with sodium thiosulphate.

The treatment of the fruit with sodium hyposulphite or other thiosulphate solution may be effected by dipping the fruit in such solution or spraying the fruit with the solution and similarly the washing operation may be performed by immersing the fruit in the wash water or spraying the fruit with the wash water, and such dipping, washing, or spraying operation may be effected by hand or by means of any suitable apparatus.

The term thiosulphate solution as herein used is to be understood as including the solution in water or any other solvent of any salt corresponding in constitution to sodium thiosulphate, $Na_2S_2O_3$, and capable of dissolving lead arsenate.

In addition to the function of removing lead arsenate from fruit, I claim the additional property of sterilizing fruit which prevents spoilage through the germicidal action of the chemicals used.

It will be understood that my invention is applicable to any product such as fruits or vegetables, etc., which have been treated in such manner as to leave a coating of lead arsenate which it is desired to remove.

I claim:

1. The process of removing lead arsenate from fruit which consists in subjecting the fruit which is coated with lead arsenate to the action of a non-acid solution of a thiosulphate capable of dissolving lead arsenate, then washing the fruit with water and allowing the same to dry.

2. The process of treating fruit which is coated with lead arsenate which comprises subjecting the fruit to the action of a non-acid solution of sodium thiosulphate so as to dissolve the lead arsenate.

In testimony whereof I have hereunto subscribed my name this 16th day of November, 1926.

ARTHUR R. MAAS.

CERTIFICATE OF CORRECTION.

Patent No. 1,754,173.  Granted April 8, 1930, to

ARTHUR R. MAAS.

It is hereby certified that error appears in the printed specification of the above numbered patent requiring correction as follows: Page 1, lines 68 and 69, for the word "hyposulphite" read "thiosulphate"; and that the said Letters Patent should be read with this correction therein that the same may conform to the record of the case in the Patent Office.

Signed and sealed this 13th day of May, A. D. 1930.

(Seal)

M. J. Moore,
Acting Commissioner of Patents.

then washing the fruit with water and allowing the same to dry.

2. The process of treating fruit which is coated with lead arsenate which comprises subjecting the fruit to the action of a non-acid solution of sodium thiosulphate so as to dissolve the lead arsenate.

In testimony whereof I have hereunto subscribed my name this 16th day of November, 1926.

ARTHUR R. MAAS.

CERTIFICATE OF CORRECTION.

Patent No. 1,754,173.  Granted April 8, 1930, to

ARTHUR R. MAAS.

It is hereby certified that error appears in the printed specification of the above numbered patent requiring correction as follows: Page 1, lines 68 and 69, for the word "hyposulphite" read "thiosulphate"; and that the said Letters Patent should be read with this correction therein that the same may conform to the record of the case in the Patent Office.

Signed and sealed this 13th day of May, A. D. 1930.

(Seal)

M. J. Moore,
Acting Commissioner of Patents.